United States Patent
Bussit et al.

(10) Patent No.: US 9,163,661 B2
(45) Date of Patent: Oct. 20, 2015

(54) ROLLING BEARING ASSEMBLY DEVICE FOR STEERING COLUMN

(71) Applicants: Sylvain Bussit, Monnaie (FR); Daniel Jansen, Tours (FR); Thomas Lepine, Villandry (FR); Bruno Montboeuf, Cerelles (FR)

(72) Inventors: Sylvain Bussit, Monnaie (FR); Daniel Jansen, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 60 days.

(21) Appl. No.: 13/907,029

(22) Filed: May 31, 2013

(65) Prior Publication Data
US 2013/0333511 A1    Dec. 19, 2013

(51) Int. Cl.
| | |
|---|---|
| *F16C 19/10* | (2006.01) |
| *F16C 19/06* | (2006.01) |
| *B62D 1/16* | (2006.01) |
| *F16C 35/073* | (2006.01) |
| *F16C 19/16* | (2006.01) |
| *F16C 25/08* | (2006.01) |
| *F16C 27/06* | (2006.01) |

(52) U.S. Cl.
CPC . *F16C 19/06* (2013.01); *B62D 1/16* (2013.01); *F16C 19/10* (2013.01); *F16C 19/163* (2013.01); *F16C 25/083* (2013.01); *F16C 27/066* (2013.01); *F16C 35/073* (2013.01); *F16C 2326/24* (2013.01)

(58) Field of Classification Search
CPC ........ F16C 19/06; F16C 19/10; F16C 19/163; F16C 27/006; F16C 35/073; F16C 25/083; F16C 2326/24; F16C 33/3806; B62D 1/16

USPC .............. 280/775; 74/492; 384/517, 535, 536
See application file for complete search history.

(56) References Cited

U.S. PATENT DOCUMENTS

| | | | | |
|---|---|---|---|---|
| 3,835,725 | A | * | 9/1974 | Furusho et al. ................. 74/492 |
| 4,181,380 | A | * | 1/1980 | Vinel et al. ..................... 384/611 |
| 5,028,152 | A | * | 7/1991 | Hill et al. ....................... 384/557 |
| 6,158,896 | A | * | 12/2000 | Zernickel et al. ............. 384/506 |
| 6,179,473 | B1 | * | 1/2001 | Ponson et al. ................. 384/537 |
| 6,375,360 | B1 | | 4/2002 | Weisskopf et al. |
| 2012/0106884 | A1 | * | 5/2012 | Doerrfuss et al. ............ 384/493 |

FOREIGN PATENT DOCUMENTS

| | | |
|---|---|---|
| EP | 1184583 A1 | 3/2002 |
| FR | 2933157 A1 | 1/2010 |
| JP | 2002021847 A | 1/2002 |
| WO | 0169098 A1 | 9/2001 |

* cited by examiner

*Primary Examiner* — Ruth Ilan
*Assistant Examiner* — Darlene P Condra
(74) *Attorney, Agent, or Firm* — Bryan Peckjian; SKF USA Inc. Patent Dept.

(57) ABSTRACT

Rolling bearing assembly device comprising an outer race, an inner race, a row of rolling elements which is arranged between the outer and inner races, a sleeve mounted in the bore of the inner race, and an elastic preload element capable of transmitting an axial preload to the inner race, the elastic preload element being mounted in direct contact with the inner race and being able to be in contact with an annular axial centring portion of the sleeve. A radial bearing flange of the sleeve extends radially from the axial centring portion towards the outside of the device and bears axially over its entire periphery against the elastic preload element.
The rolling bearing assembly device comprises an axial retention means bearing axially over its entire periphery against the radial bearing flange of the sleeve.

13 Claims, 6 Drawing Sheets

ROLLING BEARING ASSEMBLY DEVICE FOR STEERING COLUMN

CROSS-REFERENCE TO RELATED APPLICATIONS

This application claims priority to French Patent Application No. 1255036 filed May 31, 2012 and French Patent Application No. 1353969 filed on Apr. 30, 2013, the contents of which are both herein fully incorporated by reference.

FIELD OF THE INVENTION

The present invention relates to the field of rolling bearing assembly devices, notably rolling bearing assemblies used in motor vehicle steering columns.

BACKGROUND OF THE INVENTION

Steering columns generally comprise a shaft, one end of which is secured to a steering wheel that drives it and is turned by the driver of the vehicle and the other end of which is secured to mechanical components the role of which is to perform the angular positioning of the wheels of the vehicle. The steering column shaft is mounted such that it can rotate in a tubular housing via two rolling bearing assembly devices each comprising a rolling bearing, generally an angular-contact ball bearing, which are mounted in opposition.

The rolling bearing assembly generally comprises an inner race, an outer race, each race being provided with a raceway and a row of rolling elements which is arranged between the two raceways of the races. The rolling bearing assembly is mounted in the housing via its outer race and on the shaft via a sleeve or a ring known as a tolerance ring which makes it possible to compensate for any geometric defects there might be between these two components. The tolerance ring allows the rolling bearing assembly to be mounted easily on the shaft without initial clamping effect.

For preference, the assembly operates with no clearance thanks to an axial preload applied to the tolerance rings by an axially elastic member.

Thus the internal clearance within the rolling bearings is taken up, and permanent contact between the races and the rolling elements of the rolling bearing assembly is ensured.

Reference may be made on this subject to document EP 1 184 583 which describes a rolling bearing assembly device comprising an inner race, an outer race, a row of rolling elements which is arranged between the races, a tolerance ring that provides the connection between the shaft and the inner race and an axial preload elastic element. The elastic element is a washer comprising three crinkles, each bearing axially against the tolerance ring, and comprises fixing tabs for attachment to the inner race.

However, such a rolling bearing assembly device is complex to use and does not allow good distribution of axial preload over the inner race.

Reference may also be made to document WO 01/69098 which describes, in a first embodiment, a rolling bearing assembly comprising an inner race, an outer race, a row of rolling elements which is arranged between the races, a tolerance ring providing the connection between the shaft and the inner race, a damping element and a crinkle washer which is arranged axially between one radial surface of the tolerance ring and the damping element. The crinkle washer allows an axial preload to be applied. That document describes another embodiment in which the damping element comprises a metallic insert and a plurality of studs directed towards the radial surface of the tolerance ring, so that the crinkle washer can be omitted.

However, such rolling bearing assembly devices comprise a plurality of components and a damping element which is complicated to produce. Furthermore, because the axial dimension of the damping element exceeds the axial dimension of the tolerance ring, such a rolling bearing assembly device is not sufficiently compact in the axial direction. Finally, the distribution of axial preload over the inner race is not over the entire periphery of the inner race.

SUMMARY OF THE INVENTION

It is therefore an object of the present invention to remedy these disadvantages.

More specifically, the present invention seeks to provide a rolling bearing assembly device that is easy to manufacture, to assembly, is of small bulk, economical, and affords good distribution of axial preload over the inner race.

One subject of the invention is a rolling bearing assembly device comprising an outer race, an inner race, a row of rolling elements which is arranged between the outer and inner races, a sleeve mounted in the bore of the inner race, the said sleeve comprising an annular axial centring portion and an annular radial bearing flange extending radially from the axial centring portion towards the outside of the device and an elastic preload element capable of transmitting an axial preload to the inner race.

The elastic preload element is mounted in direct contact on the annular axial centring portion and with the inner race so that it can bear axially over its entire periphery against the radial bearing flange.

The annular shape of the radial bearing flange makes it possible to obtain continuous pressure in the circumferential direction between the sleeve and the preload element, i.e. the entire periphery of the radial bearing flange bearing continuously against the preload element, encouraging good distribution of the preload. In addition, the annular shape of the centring portion makes it possible to achieve uniform radial creep of the preload element, likewise encouraging good distribution of the preload.

The rolling bearing assembly device comprises an axial retention means bearing axially over its entire periphery against the radial bearing flange of the sleeve. The axial retention means thus bears continuously axially in the circumferential direction. The axial load applied to the sleeve and therefore to the inner race via the elastic preload element is therefore constant.

Because of the structure of the rolling bearing assembly device, the inner race is not retained axially by the sleeve, and this means that, in the initial state, the elastic preload element is not compressed between the inner race and the radial flange of the sleeve. The inner race, in the initial state, is therefore not subject to any internal preload when the rolling bearing assembly is being assembled.

It is necessary to apply an external axial load, via the axial retention means, to the radial flange of the sleeve in order to compress the elastic preload element between the radial flange and the inner race and thus axially preload the rolling bearing assembly. The purpose of the axial retention means is firstly to hold the rolling bearing assembly axially on the shaft and secondly to apply and maintain an axial preload on the rolling bearing assembly via the radial flange and the elastic preload element.

The sleeve may be made as a single piece.

Advantageously, each of the inner and outer races is made as a single piece.

In one embodiment, the elastic preload element has an annular shape comprising an interior bore in direct contact with the exterior cylindrical surface of the centring portion of the sleeve.

In one embodiment, the elastic preload element has a right cross section of circular or parallelepipedal, for example square or rectangular, shape.

The elastic preload element may be made of a synthetic material, such as an elastomeric material for example.

Advantageously, a groove is made on the exterior cylindrical surface of the centring portion, the shape of this groove being consistent with the shape of the elastic preload element.

The rolling bearing assembly device may comprise a cage for maintaining the circumferential spacing of the rolling elements comprising an axial annular portion of small diameter extending beyond the axial ends of the inner race and provided with a radial protrusion extending towards and collaborating with the sleeve.

A second aspect of the invention relates to a steering column comprising a tubular housing, a shaft coaxial with the housing, and at least one rolling bearing assembly device according to any one of the preceding claims, mounted between the housing and the shaft.

Advantageously, the axial retention means comprises a plurality of tabs directed substantially obliquely towards the shaft and collaborating with the shaft, so as, by bracing against the shaft, to prevent any axial movement of the axial retention means along the shaft in the opposite direction to the direction in which it was fitted.

Advantageously, the outer race is retained axially on the housing either by a radial rim of the outer race or by a shoulder of the housing.

BRIEF DESCRIPTION OF THE DRAWINGS

The present invention will be better understood from reading the description of a number of embodiments, which are given by way of entirely nonlimiting examples and illustrated in the attached drawings.

DETAILED DESCRIPTION OF THE INVENTION

The rolling bearing assembly device, of axial axis X, referenced 1 in its entirety in FIGS. 1 to 6, is intended to be mounted in a motor vehicle steering column, notably between a tubular housing 14 comprising a bore and a rotary shaft 15 coaxial with the tubular housing 14.

Figure 1:
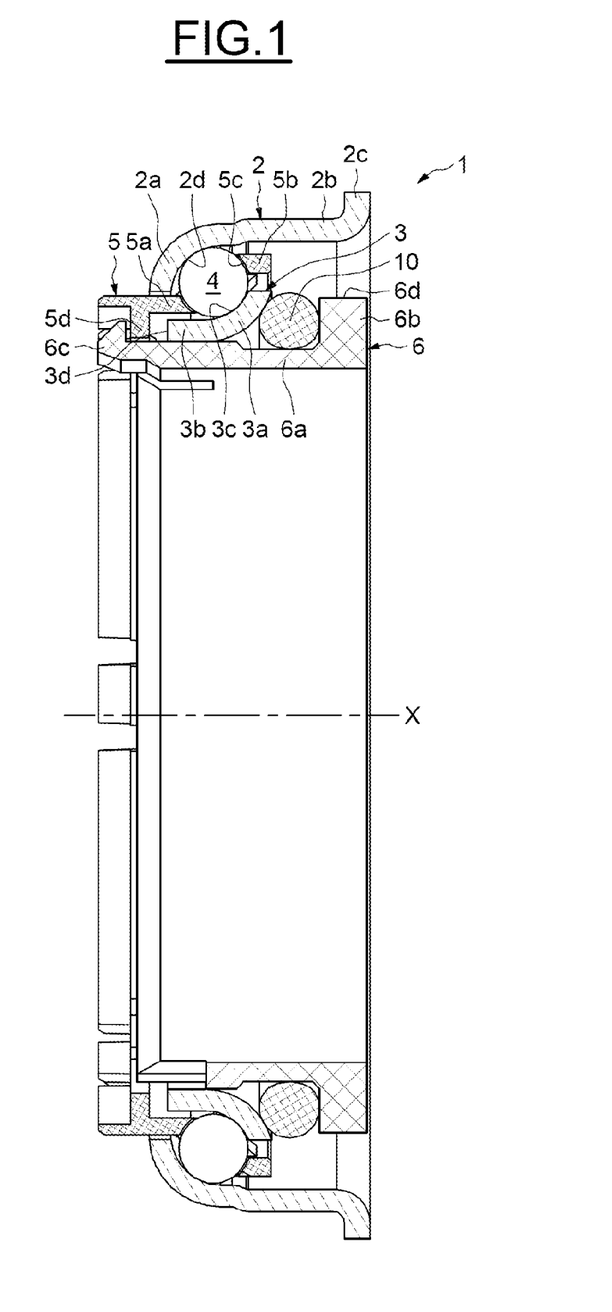
FIG. 1 is a view in axial section of a rolling bearing assembly device according to a first embodiment of the invention.
Figure 2:
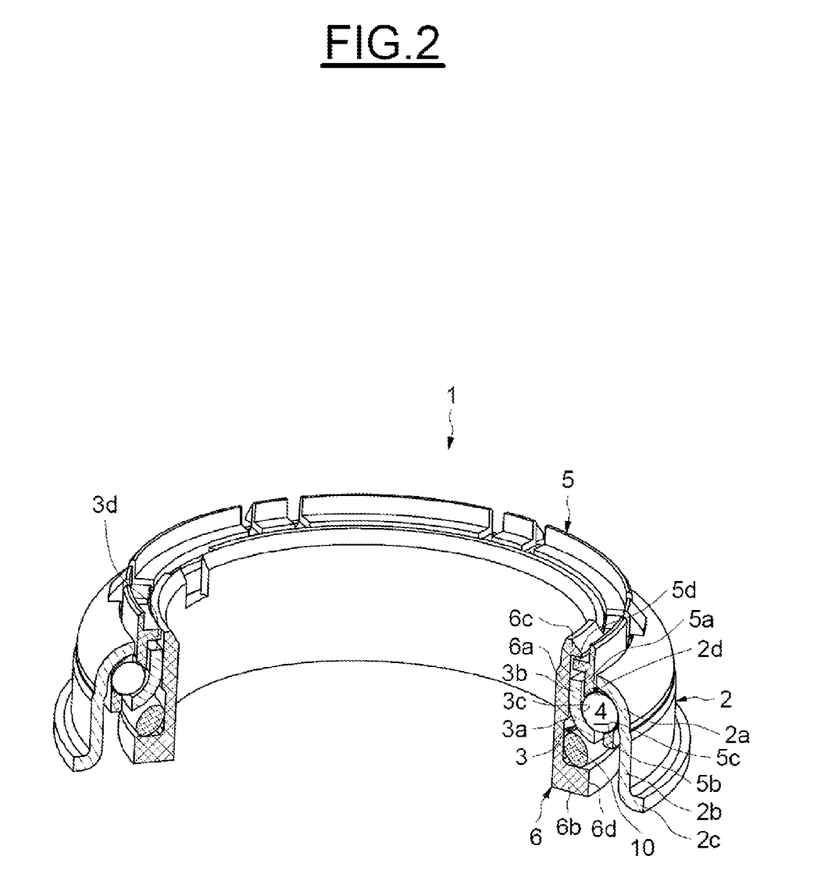
FIG. 2 is a perspective view in cross section of the device of FIG. 1.

As illustrated in FIGS. 1 and 2, the rolling bearing assembly device 1 comprises an outer race 2, an inner race 3, a row of rolling elements 4, such as balls for example, a cage 5 for maintaining an even circumferential spacing of the rolling elements 4, and a sleeve 6 or tolerance ring mounted in the inner race 3.

The outer race, made as a single part, comprises a toroidal portion 2a, an axial portion 2b and a radial rim 2c. The axial cylindrical portion 2b is arranged between the toroidal portion 2a and the radial rim 2c. The toroidal portion 2a has an interior surface that is concave in axial section to form a raceway 2d for the rolling elements 4. The radial rim 2c is directed radially towards the outside from the axial portion 2b, notably towards the tubular housing 14. The radial rim 2c thus forms an axial retention means for retaining the outer race 3 on the tubular housing 14. The toroidal portion 2a is directed radially towards the inside from the axial portion 2b.

The inner race 3, made as a single part, comprises a toroidal portion 3a and an axial cylindrical portion 3b. The toroidal portion 3a on its exterior surface, which in axial section is concave, forms a raceway 3c for the rolling elements 4. The raceway 2d is arranged on one side and the raceway 3c on the other side of a radial plane that passes through the centre of the rolling elements 4.

The rolling bearing assembly device 1 offers angular contact for the rolling elements 4, thus giving it the ability to react axial load in one direction and radial load. The outer race 2 and inner race 3 may be made from a portion of tube or from a piece of sheet metal, for example by cutting and pressing. The thickness of the outer race 2 and of the inner race 3 may be substantially constant. The inner race 3 is mounted on the sleeve 6 with sliding contact and is not retained axially by the sleeve 6. The cage 5 may be made of a synthetic material, for example of a polyamide, possibly reinforced with a mineral filler. The cage 5 comprises an axial annular portion 5a of small diameter passing between the free end of the toroidal portion 2a of the outer race 2 and an exterior surface of the axial portion 3b of the inner race 3, and an axial annular portion 5b of large diameter which is arranged on the opposite side, in other words passing between the free end of the toroidal portion 3a of the inner race 3 and a bore of the axial portion 2b of the outer race 2. As illustrated, the small-diameter axial annular portion 5a extends beyond the axial ends of the inner race 3.

The cage 5 also comprises an oblique central portion (not depicted) connected by one end to the axial annular portion 5a and by the other end connected to the portion 5b and in which the pockets 5c for the rolling elements 4 are formed.

The small-diameter axial annular portion 5a is provided with a radial protrusion 5d extending towards the sleeve 6 and intended to collaborate with the sleeve 6 for the axial retention of the rolling bearing on the sleeve 6.

The sleeve 6 comprises an annular axial centring portion 6a arranged in the bore of the inner race 3, a radial bearing flange 6b extending outwards from one end of the axial centring portion 6a on the same side as the large-diameter annular axial portion 5b of the cage 5, and a plurality of hooks 6c extending radially outwards from one end of the axial centring portion 6a which is the opposite end to the radial bearing flange 6b. The hooks 6c, which are evenly circumferentially distributed about the periphery of the sleeve 6 in a discontinuous manner are designed to collaborate with the radial protrusion 5d of the cage 5. The sleeve 6 is produced as a single piece.

The rolling bearing assembly device 1 further comprises an elastic preload element 10 separate from the sleeve 6 and capable of applying an axial preload which is transmitted to the inner race 3. In the example illustrated in FIGS. 1 and 2, the elastic element 10 is of toric annular shape, having a right cross section of substantially circular shape. The elastic element 10 is mounted in direct contact with the exterior cylindrical surface (unreferenced) of the annular axial centring portion 6a of the sleeve 6 and bearing axially against the radial bearing flange 6b. The outside diameter of the elastic torus 10 is substantially equal to the diameter of the exterior cylindrical surface 6d of the radial flange 6b of the sleeve 6. The inside diameter of the elastic torus 10 is substantially equal to the diameter of the exterior cylindrical axial surface of the axial centring portion 6a of the sleeve 6. The elastic element 10 bears continuously in the circumferential direction against a radial face of the radial bearing flange 6b, i.e. over the entire periphery of the radial bearing flange 6b.

An axial clearance (not referenced) remains between the end 3d of the axial cylindrical portion 3b and the hooks 6c of the sleeve 6, such that the inner race 3 is not axially retained by the sleeve 6. The elastic preload element 10 is not compressed between the inner race 3 and the radial flange 6b of the sleeve 6, and this means that the inner race 3 is not subjected to an internal preload during an initial step of assembling the rolling bearing assembly onto the shaft as illustrated in FIGS. 1 and 2.

The elastic element 10 is made of a synthetic or elastomeric material, such as rubber for example.

The rolling bearing assembly 1 is retained axially on the sleeve 6 by the radial protrusion 5d of the cage 5 and on the tubular housing 14 by the radial rim 2c of the outer race 2. A variant option might be to provide an outer race 2 comprising a toroidal portion 2a and an axial portion 2b, without a radial rim. For this purpose, the tubular housing 14 could comprise a shoulder (not depicted) forming a means of axially retaining the end of the axial portion 2b of the outer race 2. As a variant, the axial portion 2b of the outer race 2 can be mounted as an interference fit in the tubular housing 14.

By way of a variant, a groove may be provided on the exterior cylindrical surface of the axial centring portion 6a, the shape of the groove being consistent with the shape of the toroidal elastic element 10.

Figure 3:
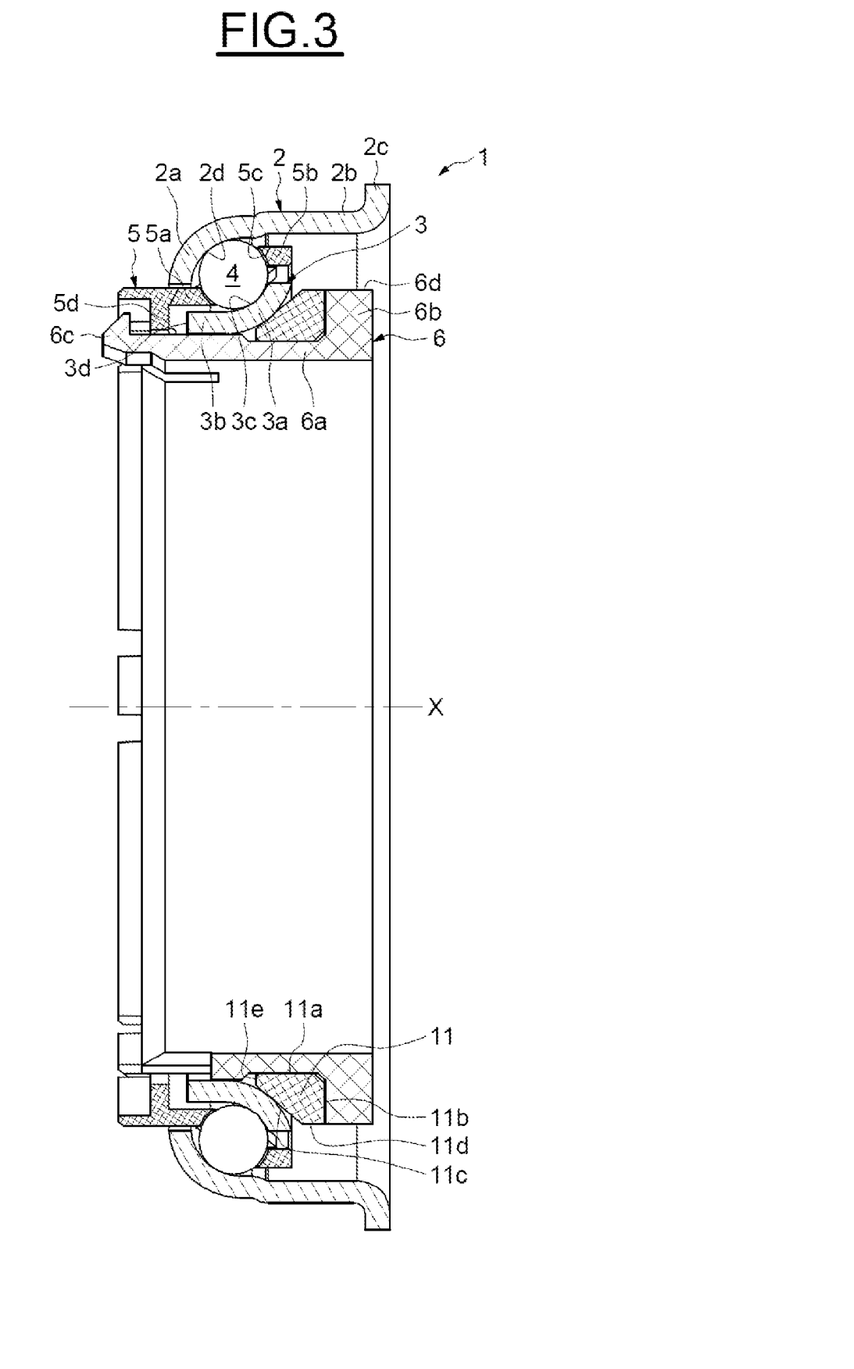
FIG. 3 is a view in axial section of a rolling bearing assembly device according to a second embodiment of the invention.

The embodiment illustrated in FIG. 3, in which the same elements bear the same references, differs from the embodiment of FIGS. 1 and 2 only in terms of the shape of the elastic preload element.

As illustrated in FIG. 3, the rolling bearing assembly device 1 comprises an elastic preload element 11 of annular shape having a right cross section of parallelepipedal shape. The preload element 11, separate from the sleeve 6, comprises an interior cylindrical axial surface 11a in contact with the exterior cylindrical axial surface (unreferenced) of the annular axial centring portion 6a of the sleeve 6, a first radial surface 11b, substantially perpendicular to the interior axial surface 6a, bearing axially directly against the radial bearing flange 6b, and an oblique surface 11c in direct contact with the exterior surface (unreferenced) of the toroidal portion 3a of the inner race 3. As illustrated, the elastic element 11 comprises an exterior cylindrical axial surface 11d connecting one end of the first radial surface 11b to one end of the oblique portion 11c and a second radial surface 11e connecting one end of the internal cylindrical surface 11a to one end of the oblique portion 11c. An alternative variant might be to provide a triangular shape, the oblique portion 11c of which would be directly connected to one end of the first radial surface 11b and to one end of the interior cylindrical axial surface 11a.

The outside diameter of the elastic element 11 is substantially equal to the diameter of the exterior cylindrical surface 6d of the radial flange 6b of the sleeve 6. The inside diameter of the internal cylindrical surface 11a of the elastic element 11 is substantially equal to the diameter of the exterior cylindrical surface of the axial centring portion 6a of the sleeve 6. The elastic element 11 illustrated in FIG. 3 bears axially continuously in the circumferential direction against a radial face of the radial bearing flange 6b, i.e. around the entire periphery of the radial bearing flange 6b.

Figure 4:
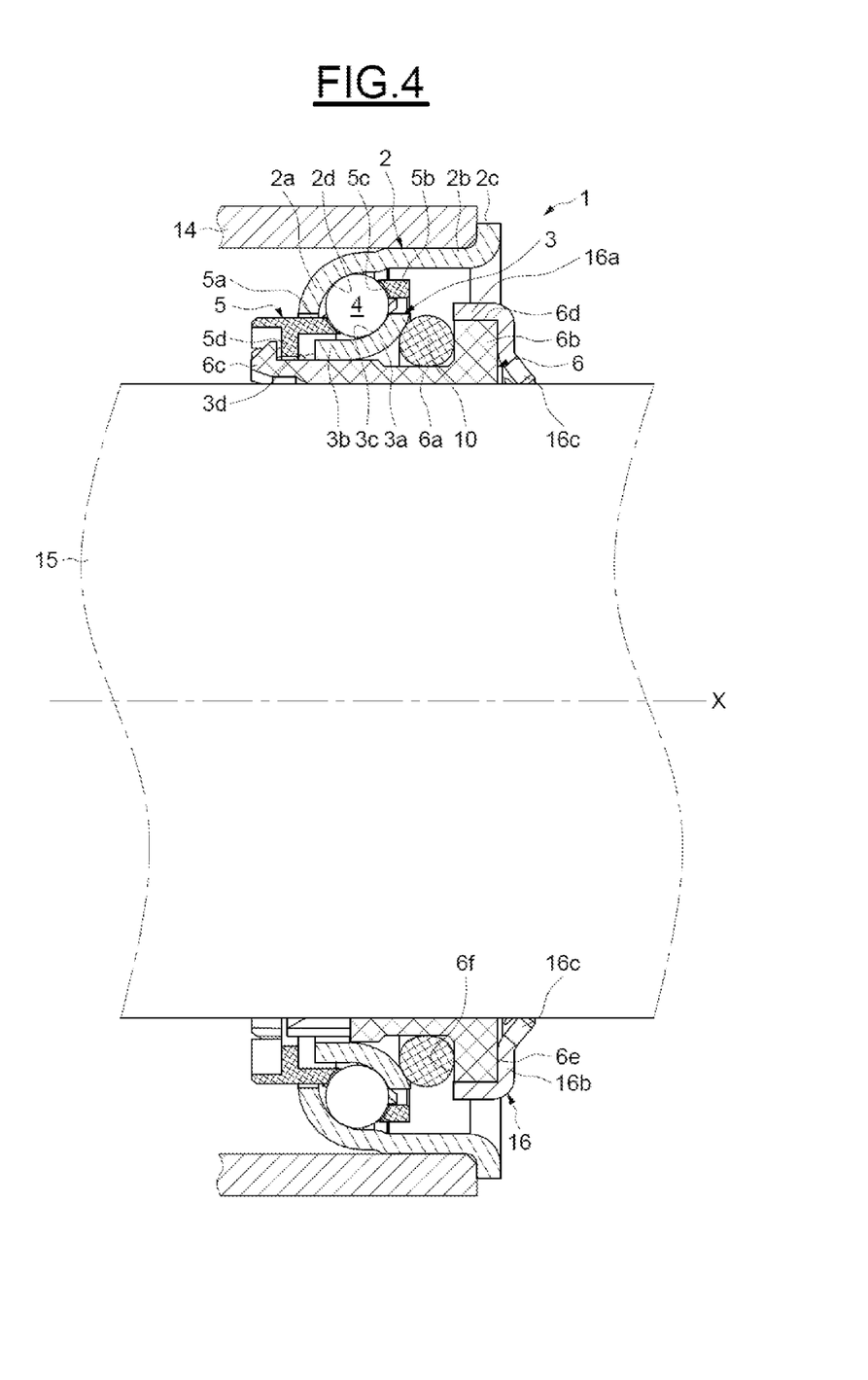
FIG. 4 is the rolling bearing assembly device according to FIG. 1 placed under axial preload by an axial retention means according to a first embodiment.
Figure 5:
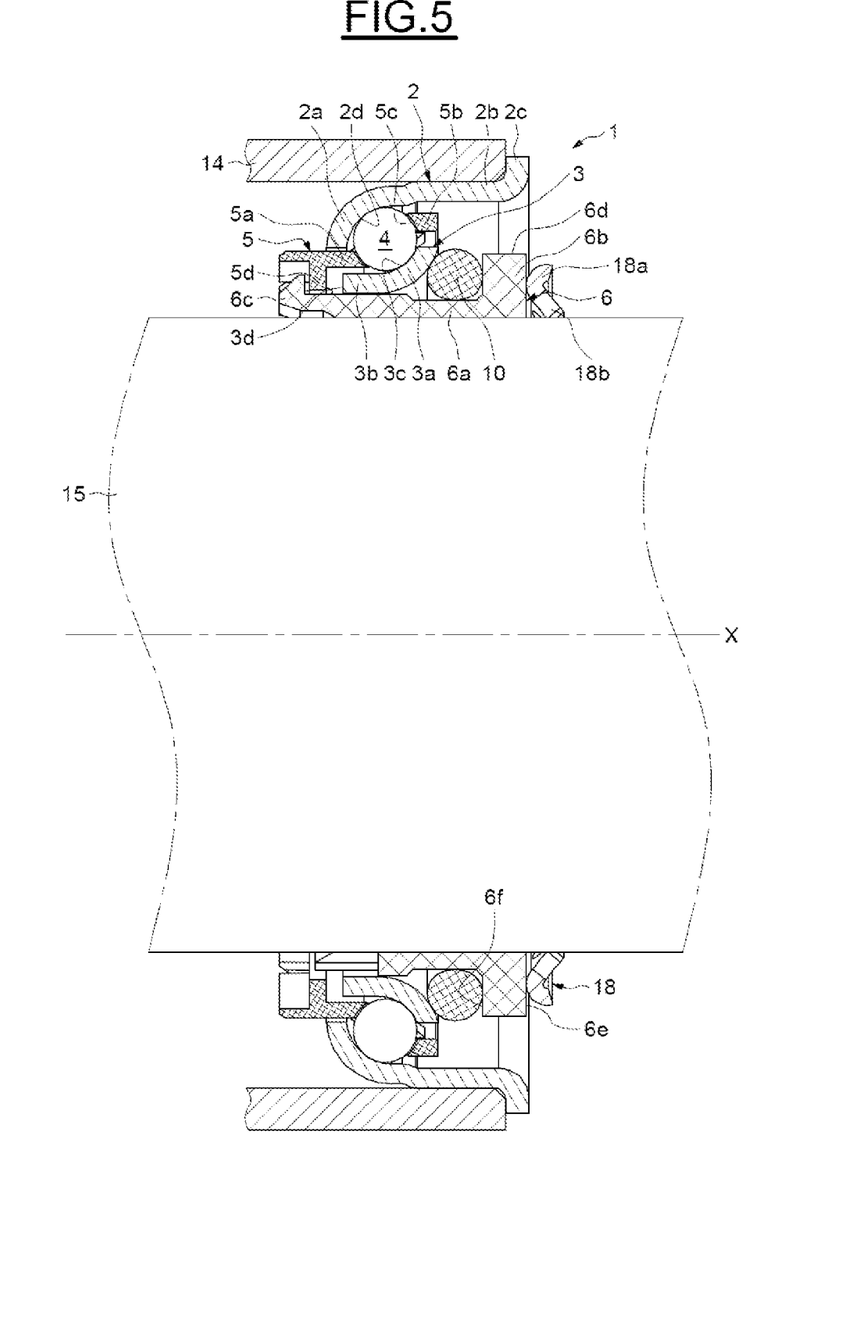
FIG. 5 is the rolling bearing assembly device according to FIG. 1, placed under axial preload by an axial retention means according to a second embodiment.
Figure 6:
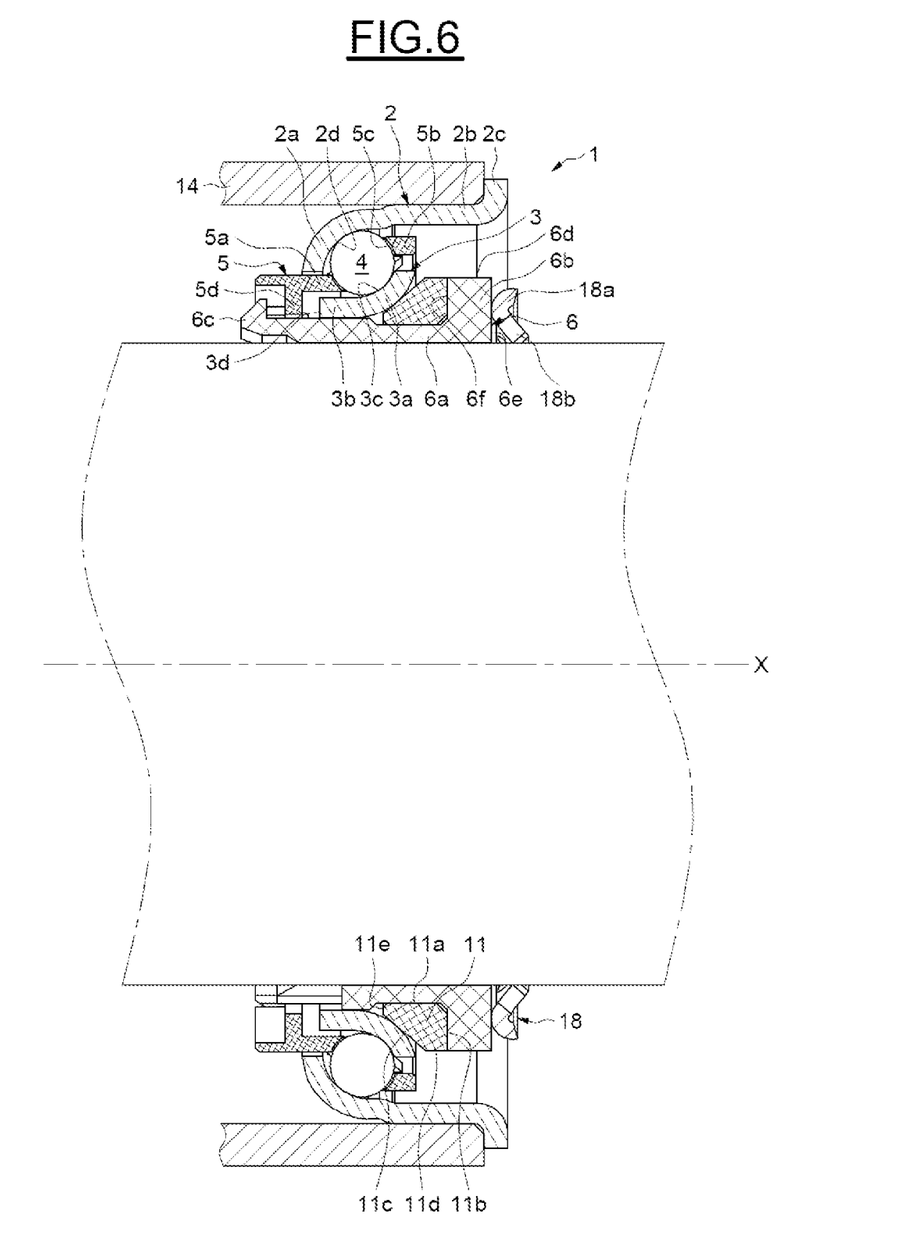
FIG. 6 is the rolling bearing assembly device according to FIG. 3, placed under axial preload by the axial retention means according to a first embodiment.

The embodiments illustrated in FIGS. 4 to 6, in which the same elements bear the same references, describe how the device 1 interacts with a locking washer.

As illustrated in FIGS. 4 to 6, the rolling bearing assembly device 1 is mounted in the bore of a housing 14 and on a shaft 15 coaxial with the housing 14. The rolling bearing assembly device 1 comprises an axial retention means 16 or locking washer intended to be mounted to bear axially against the radial flange 6b of the sleeve 6 so as firstly to hold the rolling bearing assembly axially on the shaft 15 and secondly apply and maintain an axial preload on the rolling bearing assembly via the radial flange 6b and the elastic preload element.

FIGS. 4 and 5 illustrate two embodiments of an axial retention means. However, it will be noted that any axial retention means capable of applying an axial load to the radial flange 6b of the sleeve 6 can be used, i.e. any means comprising a portion in contact with the radial flange 6b of the sleeve 6 and means of retention on the shaft 15.

The axial retention means 16, or locking washer, illustrated in FIG. 4 comprises an annular axial portion 16a forming a means of radially retaining the sleeve 6 on the shaft 15, and a radial portion 16b extending from the axial portion 16a inwards, notably towards the shaft 15. The radial portion 6b bears axially over its entire periphery against a first lateral surface 6e of the sleeve 6. The first lateral surface 6e is the surface of the radial flange 6b on the opposite side to a second lateral surface 6f of the radial flange 6b, which is in direct axial contact with the elastic preload element 10. The radial portion 16b at its end has a plurality of substantially oblique tabs 16c directed towards the shaft 15 and intended to flex elastically when the locking washer 16 is fitted onto the shaft 15 and, through bracing against the shaft, prevent any axial movement of the locking washer 16 along the shaft 15 in the opposite direction to the direction in which it was fitted.

It is necessary to apply an external axial force, via the axial retention means 16, to the radial flange 6b of the sleeve 6 in order to compress the elastic preload element 10 between the radial flange 6b and the inner race 3 and thus axially preload the rolling bearing assembly.

Thanks to the radial portion 16b of the elastic retention means 16 in axial contact over the entire periphery of the radial flange 6b of the sleeve 6, the axial load applied to the sleeve 6 is constant. Such an axial retention means 16 is also inexpensive to manufacture and simple to fit. Means of attachment may also be provided between the axial retention means 16 and the sleeve 6 so as to enhance the axial retention of the device 1 on the shaft.

The axial retention means 18, or locking washer, illustrated in FIG. 5 comprises an annular concave portion 18a having a part (unreferenced) bearing axially over its entire periphery against a first lateral surface 6e of the radial flange 6b of the sleeve, which is the opposite surface to the second lateral surface 6f in direct axial contact with the elastic preload element 10. The concave portion 18a at one of its ends has a plurality of substantially oblique tabs 18b directed towards the shaft 15 and intended to flex elastically when the locking washer 18 is fitted onto the shaft 15 and, through bracing against the shaft, prevent any axial movement of the locking washer 18 along the shaft 15 in the opposite direction to the direction in which it was fitted.

The rolling bearing assembly illustrated in FIG. 6 comprises an axial retention means 18 identical to the axial retention means 18 illustrated in FIG. 5.

As a variant, it will be noted that the locking washer 16 illustrated in FIG. 4 may also be used in the embodiment of FIG. 3.

By virtue of the invention, the axial preload is uniformly distributed over the inner race.

In addition, such elastic preload elements are simple to manufacture and to fit to the sleeve.

The invention claimed is:

1. A rolling bearing assembly device comprising:
   an outer race,
   an inner race,
   a row of rolling elements arranged between the outer and inner races,
   a sleeve mounted in the bore of the inner race, the sleeve comprising a hook extending radially outward therefrom, the sleeve being configured to provide an axial gap between the hook and the inner race,
   a cage configured to secure the row of rolling elements, the cage comprising a protrusion extending radially inward such that the protrusion and the hook of the sleeve are configured to axially collaborate to axially position the row of rolling elements relative to the hook and prevent the row of rolling elements from moving axially toward the hook, and
   an elastic preload element capable of transmitting an axial preload to the inner race, the elastic preload element being mounted in direct contact with the inner race and being able to be in contact with an annular axial centring portion of the sleeve and a radial bearing flange of the sleeve extending radially from the axial centring portion towards the outside of the device and bearing axially over its entire periphery against the elastic preload element, wherein
   an axial retainer bears axially over its entire periphery against the radial bearing flange of the sleeve.

2. The rolling bearing assembly device according to claim 1, wherein the axial retention means further comprises an axial portion forming a radial retention means for the sleeve and a radial portion extending radially from the axial portion towards the inside and bearing axially against the radial bearing flange.

3. The rolling bearing assembly device according to claim 1, wherein the sleeve is made as a single piece.

4. The rolling bearing assembly device according to claim 1, wherein each of the inner and outer races is made as a single piece.

5. The rolling bearing assembly device according to claim 1, wherein the elastic preload element has an annular shape having an interior bore in direct contact with the exterior cylindrical surface of the centring portion of the sleeve.

6. The rolling bearing assembly device according to claim 1, wherein the elastic preload element has a right cross section of circular or parallelepipedal shape.

7. The rolling bearing assembly device according to claim 1, wherein the elastic preload element is made of a synthetic material, preferably an elastomeric material.

8. The rolling bearing assembly device according to claim 1, wherein a groove is made on the exterior cylindrical surface of the centring portion, the shape of this groove being consistent with the shape of the elastic preload element.

9. The rolling bearing assembly device according to claim 1, wherein the cage maintains the circumferential spacing of the rolling elements and further comprises an axial annular portion of small diameter extending beyond the axial ends of the inner race.

10. A rolling bearing assembly device comprising:
    an outer race,
    an inner race,
    a row of rolling elements arranged between the outer and inner races,
    a sleeve mounted in the bore of the inner race, and
    an elastic preload element capable of transmitting an axial preload to the inner race, the elastic preload element being mounted in direct contact with the inner race and being able to be in contact with an annular axial centring portion of the sleeve and a radial bearing flange of the sleeve extending radially from the axial centring portion towards the outside of the device and bearing axially over its entire periphery against the elastic preload element, wherein
    an axial retention means bears axially over its entire periphery against the radial bearing flange of the sleeve,
    wherein the axial retention means further comprises a concave portion bearing axially against the radial bearing flange.

11. A steering column comprising:
    a tubular housing,
    a shaft coaxial with the housing, and
    at least one rolling bearing assembly device mounted between the housing and the shaft, the bearing assembly having;
    an outer race,
    an inner race,
    a row of rolling elements arranged between the outer and inner races,
    a sleeve mounted in the bore of the inner race, the sleeve comprising a hook extending radially outward therefrom, the sleeve being configured to provide an axial gap between the hook and the inner race,
    a cage configured to secure the row of rolling elements, the cage comprising a protrusion extending radially inward such that the protrusion and the hook of the sleeve are configured to axially collaborate to axially position the row of rolling elements relative to the hook and prevent the row of rolling elements from moving axially toward the hook, and
    an elastic preload element capable of transmitting an axial preload to the inner race, the elastic preload element being mounted in direct contact with the inner race and being able to be in contact with an annular axial centring portion of the sleeve and a radial bearing flange of the sleeve extending radially from the axial centring portion towards the outside of the device and bearing axially over its entire periphery against the elastic preload element, wherein
    an axial retainer bears axially over its entire periphery against the radial bearing flange of the sleeve.

12. The steering column according to claim 11, wherein the axial retainer further comprises a plurality of tabs directed substantially obliquely towards the shaft and collaborating with the shaft.

13. The steering column according to claim 11, wherein the outer race is retained axially on the housing.

* * * * *